Figure 1:
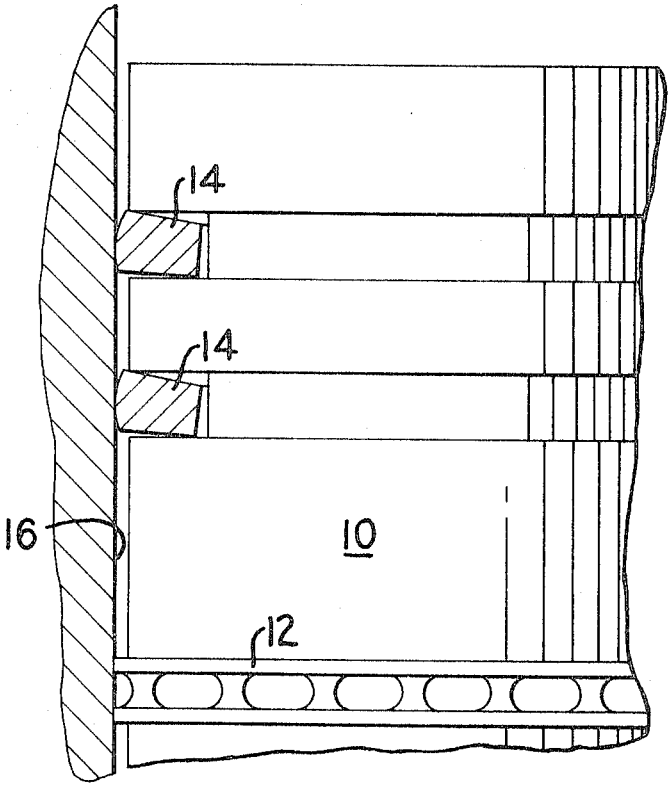
Figure 2:
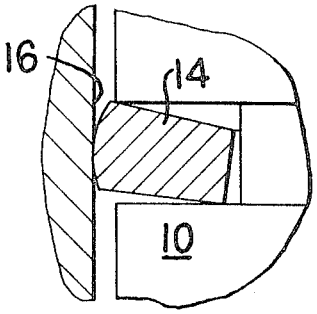
Figure 3:
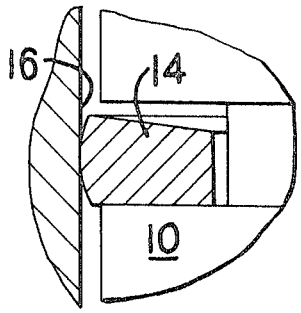

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 707

T888,014
PISTON RING AND GROOVE
Robert B. Cambron and Lemoyne E. Ott, Peoria, Ill., assignors to Caterpillar Tractor Co., Peoria, Ill.
Filed Dec. 4, 1970, Ser. No. 95,080
**Int. Cl. F16j *9/12***
U.S. Cl. 277—138
1 Sheet Drawing. 4 Pages Specification

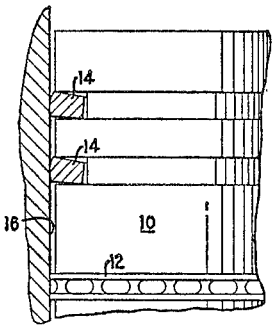

A piston ring of half-keystone configuration fitting loosely within a conventional ring groove of rectangular cross-section in which the ring is dished or twisted when closed to cylinder diameter to effect good sealing during intake and exhaust strokes and in which the ring is distorted during the power stroke to seal in a different manner.

July 20, 1971 R. B. CAMBRON ETAL T888,014

PISTON RING AND GROOVE

Filed Dec. 4, 1970

INVENTORS
ROBERT B. CAMBRON
LEMOYNE E. OTT

BY
Fryer, Tjensvold, Feix, Phillips & Lempio
ATTORNEYS